US011943127B2

United States Patent
Kan et al.

(10) Patent No.: US 11,943,127 B2
(45) Date of Patent: Mar. 26, 2024

(54) NETWORK-BASED CONTROL METHOD FOR POWER CONSUMPTION OF APPLICATIONS, TERMINAL AND STORAGE MEDIUM

(71) Applicant: ZTE Corporation, Shenzhen (CN)

(72) Inventors: Yong Kan, Shenzhen (CN); Liang Diao, Shenzhen (CN); Zhibin He, Shenzhen (GD); Sihai Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 86 days.

(21) Appl. No.: 17/619,144

(22) PCT Filed: Jun. 23, 2020

(86) PCT No.: PCT/CN2020/097727
§ 371 (c)(1),
(2) Date: Dec. 14, 2021

(87) PCT Pub. No.: WO2021/022926
PCT Pub. Date: Feb. 11, 2021

(65) Prior Publication Data
US 2022/0360514 A1 Nov. 10, 2022

(30) Foreign Application Priority Data
Aug. 6, 2019 (CN) .......................... 201910723043.5

(51) Int. Cl.
*H04L 43/10* (2022.01)
*G06F 9/48* (2006.01)
*H04L 43/0811* (2022.01)

(52) U.S. Cl.
CPC .............. *H04L 43/10* (2013.01); *G06F 9/485* (2013.01); *H04L 43/0811* (2013.01)

(58) Field of Classification Search
CPC ... H04L 43/10–43/106; H04L 43/08–43/0894; G06F 9/485
See application file for complete search history.

(56) References Cited

U.S. PATENT DOCUMENTS

| 8,223,678 B2 * | 7/2012 | Hattig .................. G06F 1/3203 370/311 |
| 8,892,748 B1 | 11/2014 | Wootton et al. |

(Continued)

FOREIGN PATENT DOCUMENTS

| CN | 105653459 A | 6/2016 |
| CN | 106941713 A | 7/2017 |

(Continued)

OTHER PUBLICATIONS

International Searching Authority. International Search Report and Written Opinion for PCT Application No. PCT/CN2020/097727 and English translation, dated Sep. 15, 2020, pp. 1-10.

(Continued)

*Primary Examiner* — Clayton R Williams
(74) *Attorney, Agent, or Firm* — Vivacqua Crane, PLLC

(57) ABSTRACT

A network-based control method for power consumption of an application, a terminal device and a non-transitory computer-readable storage medium are disclosed. The network-based control method may include: identifying a target application having a frequent wakeup or heartbeat detection behavior in response to a freezing function being enabled; monitoring whether a peer server to which the target application is connected is accessible; and freezing the target application by the freezing function in response to the peer server being inaccessible.

10 Claims, 3 Drawing Sheets

(56) References Cited

U.S. PATENT DOCUMENTS

2014/0204816 A1    7/2014  Ismail et al.
2020/0334071 A1*  10/2020  Guo ..................... G06F 9/5005

FOREIGN PATENT DOCUMENTS

| CN | 107818516 A | 3/2018 |
|----|-------------|--------|
| CN | 107861602 A | 3/2018 |
| CN | 109375995 A | 2/2019 |
| CN | 110032321 A | 7/2019 |

OTHER PUBLICATIONS

European Patent Office. Extended European Search Report for EP Application No. 20849551.5, dated May 13, 2022, pp. 1-10.

* cited by examiner

NETWORK-BASED CONTROL METHOD FOR POWER CONSUMPTION OF APPLICATIONS, TERMINAL AND STORAGE MEDIUM

CROSS-REFERENCE TO RELATED APPLICATION

This application is a national stage filing under 35 U.S.C. § 371 of international application number PCT/CN2020/097727, filed Jun. 23, 2020, which claims priority to Chinese Patent Application No. 201910723043.5, filed Aug. 6, 2019. The contents of these applications are incorporated herein by reference in their entirety.

TECHNICAL FIELD

Embodiments of the present disclosure relate to, without limitation, the field of communication technology, and more particularly to, without limitation, a network-based control method for power consumption of an application, a terminal device, and a non-transitory computer-readable storage medium.

BACKGROUND

With the continuous development of intelligent terminal platforms and network bandwidth, users are provided with a wide variety of functions. Most applications more or less provide various services, such as video viewing, web browsing, cloud data storage and server verification, through the network and the cloud. Such network interaction and access, which allows a large amount of data to be sent and received for access, is also a major factor affecting the service life of terminal devices.

In related technologies, data of an application is controlled mainly by regularly cleaning up the application or configuring a firewall. However, the regular cleanup cannot ensure the normal data sending and receiving of the application, thus affecting functions of the application, while the firewall only impairs the accessibility of packets sent and received by the application. In the application data control methods in related technologies, applications still actively wake up a terminal device and send handshake messages, so there is still a problem of reduced battery duration.

SUMMARY

According to embodiments of the present disclosure, a network-based control method for power consumption of an application, a terminal device and a non-transitory computer-readable storage medium are provided to at least solve one of the technical problems in the above technologies to a certain extent, such as the problem that a centralized control of application data may shorten the duration of the battery.

In view of this, according to an embodiment of the present disclosure, a network-based method for regulating application power consumption is provided, including: identifying a target application having a frequent wakeup or heartbeat detection behavior after a freezing function is enabled; monitoring whether a peer server to which the target application is connected is accessible; and freezing the target application by the freezing function in response to the peer server being not accessible.

According to an embodiment of the present disclosure, a terminal device is further provided, including a processor, a memory and a communication bus, where the communication bus is configured to perform connection and communication between the processor and the memory; and the processor is configured to execute one or more programs stored in the memory to perform the steps of the network-based control method for power consumption of an application.

According to an embodiment of the present disclosure, a non-transitory computer-readable storage medium storing one or more programs is further provided, where the one or more programs, when executed by one or more processors, cause the one or more processors to perform the steps of the network-based control method for power consumption of an application described above.

Other features and corresponding beneficial effects of the present disclosure are described below in the specification, and it should be understood that at least some of the beneficial effects become apparent in the description of the specification of the present disclosure.

DETAILED DESCRIPTION

In order to make the objective, technical schemes and advantages of the present disclosure clearer, embodiments of present disclosure will be further described in detail below with reference to the accompanying drawings by way of embodiments. It should be understood that the embodiments described herein are only for explaining the present disclosure, and are not intended to limit the present disclosure.

Embodiment One

In related technologies, there are two main methods for controlling background data of an application. The first is to regularly clean up the application after the application runs in the background. The second is to configure a firewall after the application runs in the background, so as to disable the application from sending and receiving packets. Background cleanup cannot ensure the normal data sending and receiving of the application, thus affecting functions of the application, while the firewall only impairs the accessibility of packets sent and received by the application. However, the application will still actively wake up a terminal device and send handshake messages, so that there is still a problem of reduced battery duration. To solve the above problem, a network-based control method for power consumption of an application is provided in the embodiment of the present disclosure, including first determining whether an application freezing function is enabled since the network environment of a system is dynamic and ever-changing; if so, recording and monitoring network characteristics of all applications in the system to identify a target application that frequently detects heartbeats of servers, and monitoring network access of the target application, that is, a peer server to which the target application is connected. If the peer server becomes inaccessible due to lack of a data access function in the current network environment or for other reasons, the target application needs to be frozen. By limiting physical resources (including CPU, memory, I/O, and network) used by process groups through a system kernel, the target application will not frequently wake up the system or send network data or handshake messages, thus saving power consumption.

Figure 1:
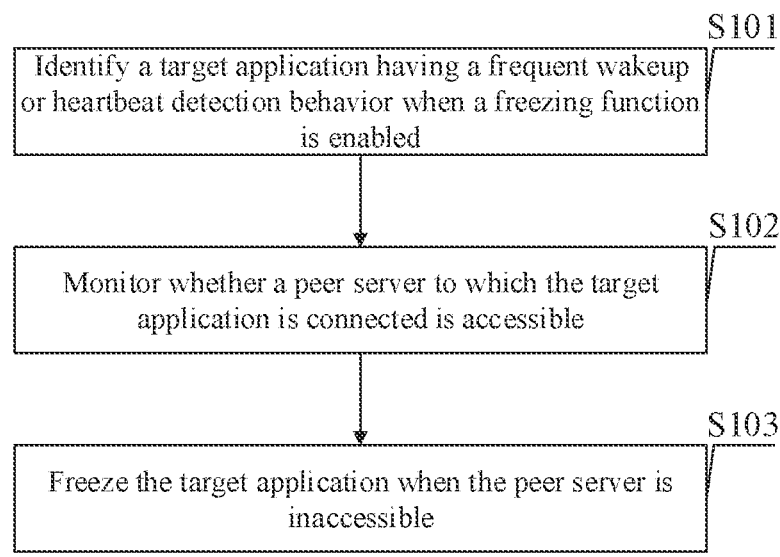
FIG. 1 is a flowchart of a network-based control method for power consumption of an application according to embodiment one of the present disclosure.

FIG. 1 is a network-based control method for power consumption of an application provided in the embodiment of the present disclosure. As shown in FIG. 1, the network-based control method for power consumption of an application includes following steps of S101 to S103.

In a step of S101, a target application having a frequent wakeup or heartbeat detection behavior is identified when a freezing function is enabled.

It should be noted that the freezing function is responsible for receiving and implementing freezing and unfreezing operations of the target application, with a process freezing technology as its core technology. The process freezing technology is mainly a terminal-based method for restricting the occupation of system resources by applications, including but not limited to CPU resources, Sensor, GPS (global positioning system), memory and other peripheral resources. In the embodiment of the present disclosure, the terminal device is provided with a freezing function, and before the target application is identified, it is necessary to determine whether the freezing function is enabled either by detecting whether a user sends an operating command to enable the freezing function or by detecting whether there is an application to be frozen in all applications of the terminal device. For example, when the user taps "Freezing Function Enable", the terminal device enables the freezing function.

In an embodiment of the present disclosure, the target application having a frequent wakeup or heartbeat detection behavior is identified in all applications of the terminal device, and the frequent wakeup or heartbeat detection behavior will cause power consumption to the terminal device. In the embodiment of the present disclosure, there are following two methods for identifying the target application in all applications.

The first method is to detect network behaviors of all applications to identify the target application having the frequent wakeup or heartbeat detection behavior. In order to communicate with the peer server, the application will wake up the terminal device regularly and send heartbeat detection message. When it is detected that a number of times that an application wakes up the terminal device or detects heartbeats exceeds a default number of times within a period of time, it is determined that the application has the frequent wakeup or heartbeat detection behavior, and the default number of times may be set by the terminal device or defined by a user. Specifically, a cyclic and regular detection method may be adopted. For example, the terminal device detects that an application A detects heartbeats for x times at an interval of T, and the application A is identified as the target application when x is greater than the number of times set by the terminal device. For another example, the terminal device acquires the number of times that the application A detects heartbeats at the interval of T, and the application A is identified as the target application when the number of times that the application A detects heartbeats in at least two cycles T is both greater than a normal number of times of heartbeat detection.

The second method is to identify the target application having the frequent wakeup or heartbeat detection behavior based on a default information base. The default information base includes a default application library that is restricted from connecting to the peer server, e.g., in Chinese mainland, Google is under regulation and thus its relevant servers are inaccessible, and some school website applications are inaccessible using extranet. In such cases, even without any connection to a designated server, the application will frequently wake up the terminal device and send handshake messages, resulting in reduced battery duration of the terminal device. Therefore, the applications in the default application library may be taken as the target application. Of course, the applications in the default application library may be flexibly adjusted as the case may be. For example, when accessing a school website by intranet, no school website application is included in the default application library. In the embodiment of the present disclosure, the default information base further includes current network states of the terminal device. For example, when the terminal device is in arrears, no application can be connected to the peer server. For another example, in some cases or in some areas (such as in a signal blocking area with a signal blocker), there are certain restrictions on network access or the network is inaccessible, and no application can be connected to the peer server. Therefore, when there are network restrictions on the current network state of the terminal device, the application will still actively wake up the terminal device or detects heartbeats, and the applications (such as "WeChat", "WEIBO" and other third-party applications) that need to communicate with the server are the target application.

In the embodiment of the present disclosure, the target application may be identified only by the first method or the second method, or by a combination of the first method and second method. For example, when it is determined that an application B has a frequent wakeup behavior through detection of network behaviors of the applications, whether the application B is included is determined according to the default application library of the information base, if so, the application B is identified as the target application.

In a step of S102, whether a peer server to which the target application is connected is accessible is monitored.

In an embodiment of the present disclosure, whether the target application is normally connected to the server is determined by detecting whether the peer server is accessible. It will be understood that it is very likely that the peer server to which the target application is connected is inaccessible if the current network environment of the terminal device does not have the access capability. Therefore, before monitoring whether the peer server to which the target application is connected is accessible, it should be determined that the current network environment is an Internet-connected environment, i.e., the data access function is available in the current network environment. The terminal device may determine whether an SIM (Subscriber Identity Module, and IC) is inserted therein, if so, the current Internet connection of the terminal device is obtained either by further determining whether a data service is enabled or by directly determining whether the terminal device is connected to a wireless network (Wifi) available.

When the terminal device is connected to the Internet, the peer server to which the target application is connected is monitored, and whether the peer server is accessible is detected cyclically by network commands. The network commands include, without limitation, DNS, PING, and Socket. For example, if the terminal device sends a PING command to the peer server at t1 without any response message from the peer server, and then sends a PING command to the peer server again at t2 still without any response message from the peer server, that is, there is no response message from the peer server at both t1 and t2 which are in one cycle, it is determined that the peer server is inaccessible. For another example, if t1 and t2 are in two adjacent cycles and there is no response message from the peer server, it is determined that the peer server is inaccessible. In some embodiments, it is also possible to determine whether the server is accessible by determining whether a response message is received within a preset time after the target application sends a heartbeat packet to the peer server for heartbeat detection.

In a step of S103, the target application is frozen after the peer server is inaccessible.

If the peer server is inaccessible for other reasons in the current Internet-connected environment, the target application is frozen. In this case, the target application will not frequently wake up the system or send network data or handshake messages, thus saving power consumption.

It should be understood that the peer server to which the target application is connected is inevitably inaccessible when there is no connection between the terminal device and the Internet, so the target application may be directly frozen.

It should be noted that the freezing function will send a freezing command when the target application is frozen by the terminal device. In this case, the terminal device will freeze a process of the target application based on other states of the target application. For example, when the peer server is inaccessible and it is determined that the current target application is running in the background, the process of the target application is frozen. For example, when the peer server is inaccessible and the current target application runs in the foreground, but the terminal device is currently in a screen-off state, the process of the target application is frozen. In some embodiments, it is also possible to determine whether the target application is a default core or a key application, and if so, the process of the target application is frozen.

In some embodiments, the freezing function may be automatically enabled to freeze the target application after the terminal device identifies a target application having the frequent wakeup or heartbeat detection behavior and detects that the peer server accessed by the target application is inaccessible.

After the target application is frozen, the terminal device may further unfreeze the target application actively or passively. For example, when the target application runs in the foreground or the peer server becomes accessible, the target application is unfrozen. After the Internet connection of the terminal device resumes or/and the server becomes accessible, the freezing function will send an unfreezing command to unfreeze a kernel process of the target application. If the user taps the target application to run the target application in the foreground, the terminal device will immediately unfreeze the target application, cancel all controls on the target application, and lift all restrictions until the target application runs in the background again.

With the network-based control method for power consumption of an application provided in the embodiment of the present disclosure, when the freezing function is already enabled normally, it is detected and monitored whether there is a target application frequently detecting heartbeats or waking up the terminal device, the server status of the target application in the current network environment is monitored, and if the server is inaccessible and the target application runs in the target application, the target application will be frozen, so as to avoid power consumption caused by frequent wakeup and heartbeat detection.

Embodiment Two

Figure 2:
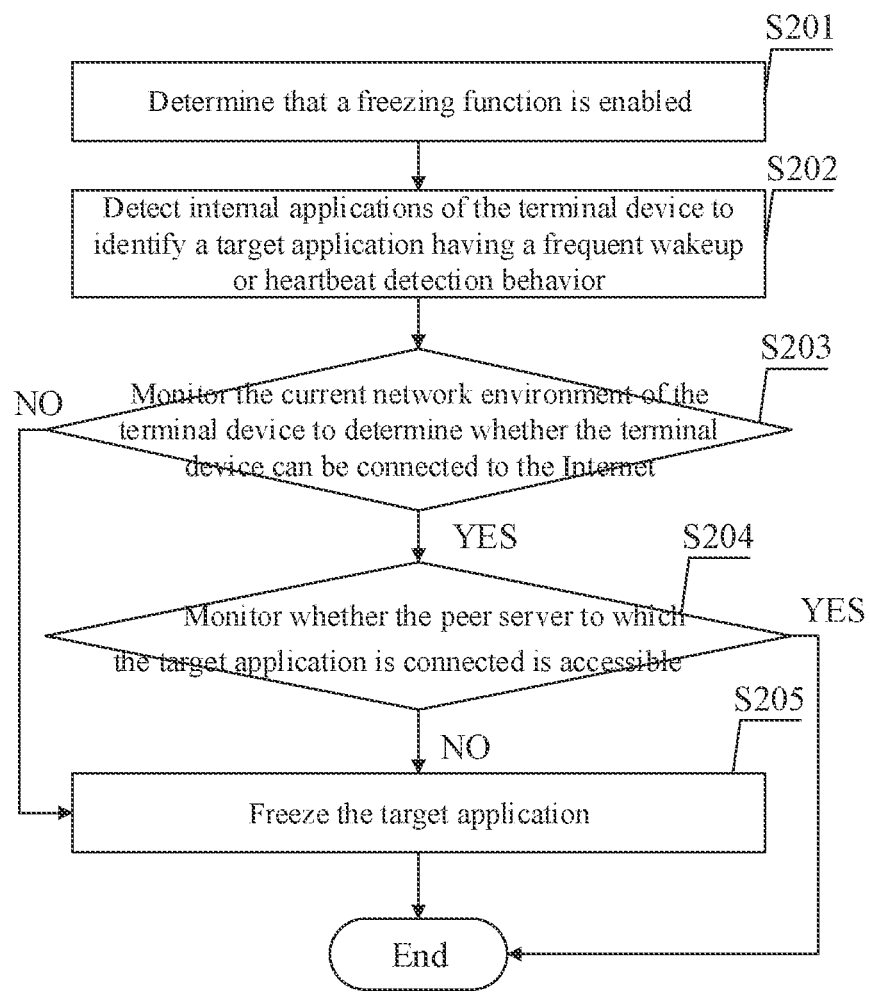
FIG. 2 is a flowchart of a network-based control method for power consumption of an application according to embodiment two of the present disclosure.

In the embodiment of the present disclosure, a network-based control method for power consumption of an application is provided, as shown in FIG. 2, including following steps of S201 to S206.

In a step of S201, it is determined that a freezing function is enabled.

In the embodiment of the present disclosure, the terminal device detects whether an enabling command is received from the freezing function, and the process ends if the freezing function is not enabled.

In a step of S202, internal applications of the terminal device are detected to identify a target application having a frequent wakeup or heartbeat detection behavior.

First, a cyclic and regular detection method may be adopted to detect network behaviors of an application A. If a number of times of heartbeat detection obtained in two cycles is greater than a normal number of times of heartbeat detection, the application A is preliminarily determined as the target application. In this case, whether the application A is an application in an available default application library is further determined according to the default application library that is restricted from connecting to the peer server, if so, it is determined that the application A is the final target application. In some embodiments, when the application A is preliminarily determined as the target application but is not included in the default application library, the application A may still be taken as the final target application, or whether to take the application A as the final target application may be determined based on a current battery level of the terminal device.

In a step of S203, the current network environment of the terminal device is monitored to determine whether the terminal device can be connected to the Internet. If so, the step S204 is performed. Otherwise, the S205 is performed.

The peer server to which the target application is connected is inevitably inaccessible when there is no connection between the terminal device and the Internet, so the target application can be directly frozen.

In a step of S204, whether the peer server to which the target application is connected is accessible is monitored. If so, the step S205 is performed. Otherwise, the process ends.

The peer server to which the target application is connected is acquired, and whether the peer server is accessible is monitored, which may be detected by common network commands such as PING commands and Socket.

In a step of S205, the target application is frozen.

Upon receipt of a freezing command, the freezing function determines whether the target application is an application running in the background. If so, the target application is frozen. By freezing a process group, such application will not frequently wake up the system or send network data or handshake messages, thus saving power consumption.

In a step of S206, the target application is unfrozen when the target application is switches to run in the foreground or the peer server becomes accessible.

When the Internet connection resumes or the server becomes accessible, or if the user taps the application to run the application in the foreground, the terminal device will immediately unfreeze the application, cancel all control strategies on the application, and lift all network limitations until the application runs in the background again.

In the embodiment of the present disclosure, by identifying the current network environment of the terminal device and the accessibility of the server, the target application is actively frozen using the freezing technology when it is detected that the server accessed by the target application is inaccessible, so as to avoid unnecessary wakeup and data receiving and sending operations. When the server being accessed becomes accessible, the target application is unfrozen and services thereof are resumed, so as to improve the duration of the terminal device.

Embodiment Three

Figure 3:
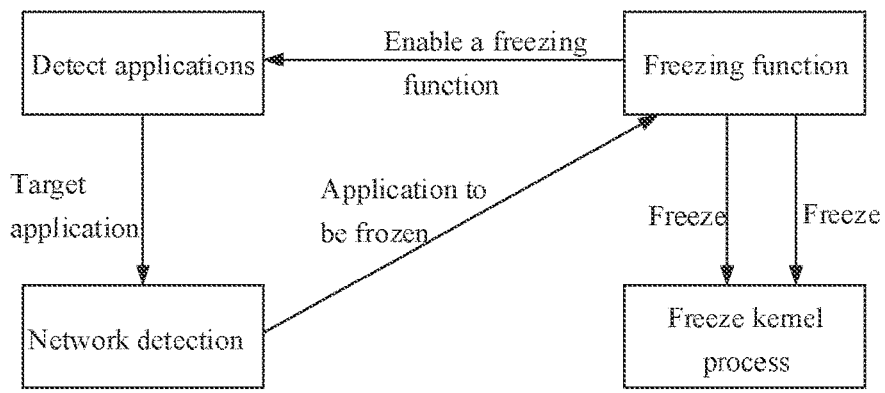
FIG. 3 is a schematic diagram of a terminal device for regulating power consumption of applications according to embodiment three of the present disclosure.
Figure 4:
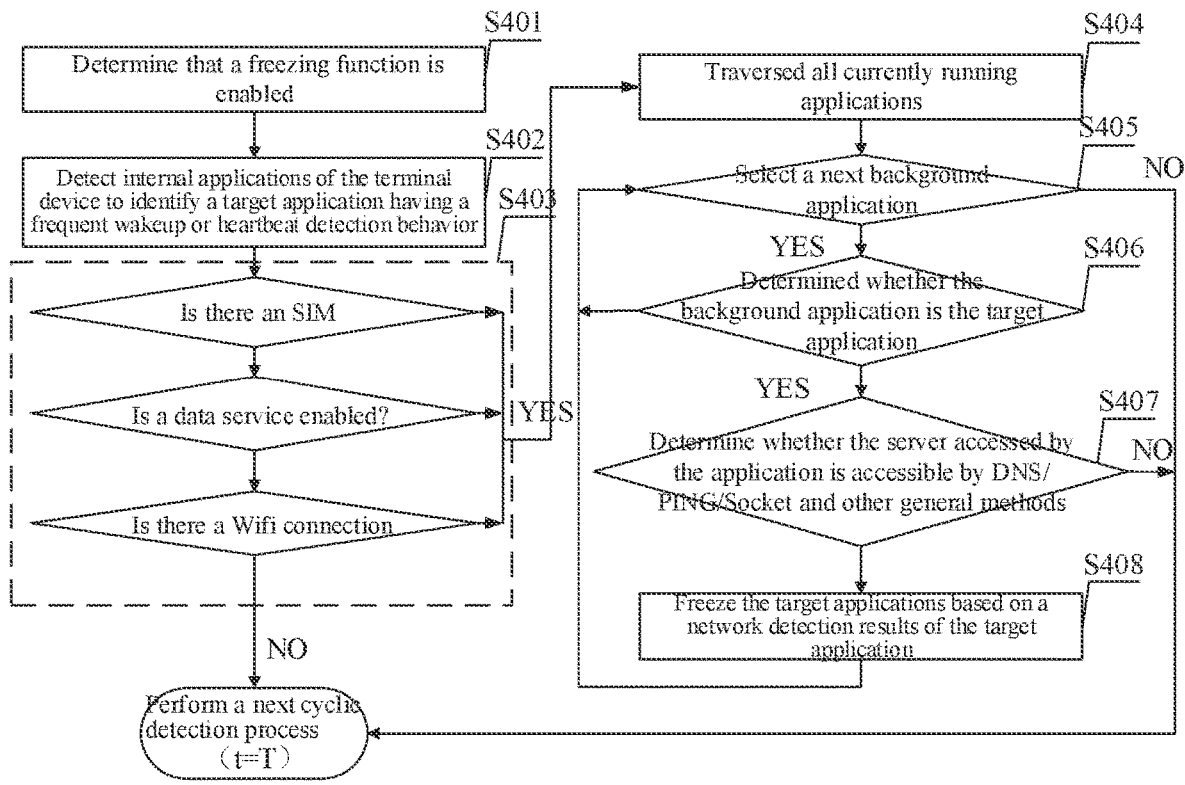
FIG. 4 is a flowchart of a network-based control method for power consumption of an application according to embodiment three of the present disclosure.

For ease of understanding, the network-based control method for power consumption of an application will be described using a more specific example in this embodiment of the present disclosure. FIG. 3 is a flowchart of a terminal device for regulating power consumption of applications. As shown in FIG. 3, after a freezing function of the terminal device is enabled, the terminal device detects applications therein to identify a target application, performs network detection on the target application, identifies the applications to be frozen based on network detection results, and freezes the applications to be frozen by freezing a kernel process by the freezing function. Specifically, as shown in FIG. 4, which is a flowchart of the network-based control method for power consumption of an application, the method includes following steps of S401 to S408.

In a step of S401, it is determined that a freezing function is enabled.

In a step of S402, network characteristics of internal applications of the terminal device are detected to identify a target application having a frequent wakeup or heartbeat detection behavior.

In the embodiment of the present disclosure, an application having the frequent wakeup or heartbeat detection behavior is identified based on a knowledge base available. Alternatively, a cyclic and regular detection method may be adopted to detect network behaviors of the applications to identify the application having the frequent wakeup or heartbeat detection behavior.

In a step of S403, a current Internet connection of the terminal device is obtained, and a next cyclic detection process is performed directly when there is no SIM inserted, no enabled data service, or no Wifi and other data network environment available.

In a step of S404, all currently running applications are traversed.

In a step of S405, a next background application is selected, and if there is no such application, the cyclic detection process ends.

In a step of S406, whether the background application is the target application is determined. If so, the S407 is performed. Otherwise, the process ends.

In a step of S407, a server accessed by the application is obtained, and whether the server is accessible is determined by DNS/PING/Socket and other general methods. If so, the S408 is performed. Otherwise, the next cyclic detection process is performed directly.

In a step of S408, the target applications are frozen based on a network detection result of the target application.

Embodiment Four

Figure 5:
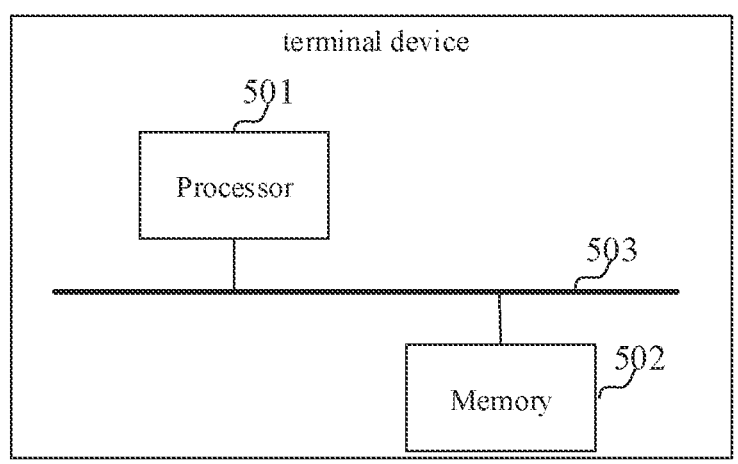
FIG. 5 is a schematic structural diagram of a terminal device according to embodiment four of the present disclosure.

In the embodiment of the present disclosure, a terminal device which may be implemented in various forms is provided. For example, the terminal devices described in the embodiment of the present disclosure may include mobile terminals such as mobile phones, tablet computers, notebook computers, palm computers, Personal Digital Assistant (PDA), Portable Media Player (PMP), navigation devices, wearable devices, smart bracelets and pedometers, as well as fixed terminal devices such as digital TVs and desktop computers. As shown in FIG. 5, the terminal device includes a processor 501, a memory 502, and a communication bus 503.

The communication bus 503 is configured to perform connection and communication between the processor 501 and the memory 502.

The processor 501 is configured to execute one or more computer program stored in the memory 502 to perform the following steps in above embodiments:
  determining that there is a target application having a frequent wakeup or heartbeat detection behavior when a freezing function is enabled;
  monitoring whether a peer server to which the target application is connected is accessible; and
  freezing the target application by the freezing function after the peer server becomes inaccessible.

The target application having the frequent wakeup or heartbeat detection behavior is identified by following two methods. The first method is to detect network behaviors of all applications to identify the target application having the frequent wakeup or heartbeat detection behavior. The second method is to identify the target application having the frequent wakeup or heartbeat detection behavior based on a default information base.

In an embodiment of the present disclosure, whether the peer server to which the target application is connected is accessible is determined only after determining that the current network environment is an Internet-connected environment. Specifically, whether the peer server is accessible may be cyclically detected through network commands. The target application can be frozen directly when it is determined that the current network environment is an Internet-disconnected environment.

It should be noted that as an essential part of the embodiments of the present disclosure, the freezing function is responsible for receiving and implementing freezing and unfreezing operations of the target application. Before freezing the target application, whether the target application is running in the background may be determined, if so, a process of the target application is frozen. The target application is unfrozen when the target application runs in the foreground or the peer server becomes accessible.

In an embodiment of the present disclosure, a non-transitory computer-readable storage medium storing one or more programs is further provided, where the one or more programs, when executed by one or more processors, cause the one or more processors to perform the steps of the network-based control method for power consumption of an application in the above embodiments.

The non-transitory computer-readable storage medium includes volatile or nonvolatile, removable or non-removable media implemented in any method or technology for storing information, such as computer-readable commands, data structures, computer program modules or other data. A computer readable storage medium includes, without limitation, RAM (Random Access Memory), ROM (Read-Only Memory), EEPROM (Electrically erasable programmable read-only memory), flash memory or other memory technologies, CD-ROM (Compact Disc Read-Only Memory), digital versatile disc (DVD) or other optical disc memory, cartridge, tape, disk memory or other magnetic memory devices, or any other media configured to store desired information and accessed by a computer.

According to the network-based control method for power consumption of an application, the terminal device and the non-transitory computer-readable storage medium provided in the embodiments of the present disclosure, a target application having a frequent wakeup or heartbeat detection behavior is identified when a freezing function is enabled; whether a peer server to which the target application is connected is accessible is monitored; and the target application is frozen by the freezing function when the peer server is inaccessible. In some implementation processes, those applications that frequently perform heartbeat detection with the server can be controlled timely and effectively using the freezing technology after determining that the peer server to which each application is connected is inaccessible by detecting network access thereof, thereby reducing the power consumption caused by frequent wakeup and heartbeat detection.

Therefore, those having ordinary skills in the art should understand that all or some of the steps, systems and functional modules/units in the devices disclosed above can be implemented as software (which may be implemented by computer program codes executable by a computing device), firmware, hardware and appropriate combinations thereof. In the implementations by hardware, the division between the functional modules/units mentioned in the above description does not necessarily correspond to the division of physical components. For example, a physical component may have a plurality of functions, or a function or step may be performed cooperatively by several physical components. Some or all of the physical components may be implemented as software executed by a processor, such as CPU, a digital signal processor or a microprocessor, or as hardware, or as an integrated circuit, such as an application specific integrated circuit.

Furthermore, it is well known to those of ordinary skill in the art that communication media typically contain computer-readable commands, data structures, computer program modules, or other data in modulated data signals such as carrier transmission or other transmission mechanisms, and may include any information delivery media. Therefore, the present disclosure is not limited to any particular combination of hardware and software.

The above descriptions are further detailed descriptions of the embodiments of the present disclosure with reference to specific implementation ways, and it cannot be assumed that the specific implementation ways of the present disclosure are limited to these descriptions. For those of ordinary skill in the art to which the present disclosure belongs, a number of simple derivations or substitutions may also be made without departing from the concept of the present disclosure, all of which should be regarded as falling into the protection scope of the present disclosure.

What is claimed is:

1. A network-based control method for power consumption of an application, comprising:
    identifying a target application having a heartbeat detection behavior in response to a freezing function being enabled;
    monitoring whether a peer server to which the target application is connected is accessible; and
    freezing the target application by the freezing function in response to the peer server being inaccessible.

2. The network-based control method of claim 1, wherein before monitoring whether a peer server to which the target application is connected is accessible, the method comprises:
    determining that the current network environment is an Internet-connected environment.

3. The network-based control method of claim 2, wherein identifying a target application having a heartbeat detection behavior comprises:
    detecting network behaviors of all applications to identify the target application having the heartbeat detection behavior.

4. The network-based control method of claim 2, wherein identifying a target application having a heartbeat detection behavior comprises:
    identifying the target application having the heartbeat detection behavior based on a default information base.

5. The network-based control method of claim 1, wherein monitoring whether a peer server to which the target application is connected is accessible comprises:
    cyclically detecting whether the peer server is accessible by a network command.

6. The network-based control method of claim 5, further comprising:
    freezing the target application after determining that the current network environment is an Internet-disconnected environment.

7. The network-based control method of claim 6, wherein freezing the target application comprises:
    freezing the process of the target application after the target application runs in the background.

8. The network-based control method of claim 7, after freezing the target application, comprising:
    unfreezing the target application in response to the target application switching to run in the foreground or the peer server becoming accessible.

9. A terminal device, comprising a processor, a memory, and a communication bus, wherein the communication bus is configured to perform connection and communication between the processor and the memory; and
    the processor is configured to execute one or more computer programs stored in the memory to perform the steps of a network-based control method for power consumption of an application, comprising:
        identifying a target application having a heartbeat detection behavior in response to a freezing function being enabled;
        monitoring whether a peer server to which the target application is connected is accessible; and
        freezing the target application by the freezing function in response to the peer server being inaccessible.

10. A non-transitory computer-readable storage medium storing one or more programs, wherein the one or more programs, when executed by one or more processors, cause the one or more processors to perform the steps of the network-based control method of claim 1.

* * * * *